J. M. WEBB.
Coffee Pot.

No. 14,334. Patented Feb. 26, 1856.

UNITED STATES PATENT OFFICE.

JACOB M. WEBB, OF SOMMERVILLE, TENNESSEE.

COFFEE-POT.

Specification of Letters Patent No. 14,334, dated February 26, 1856.

*To all whom it may concern:*

Figure 1:
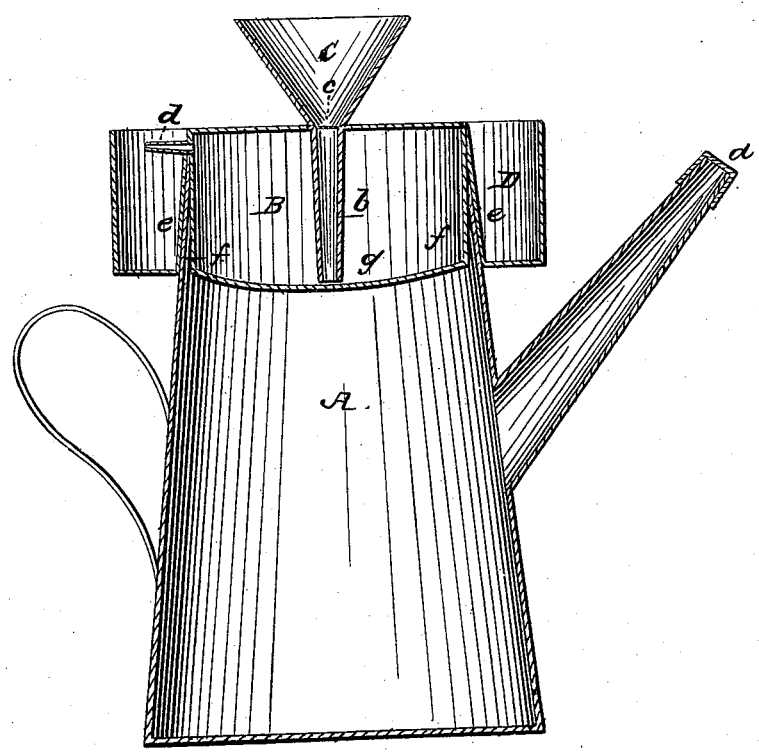
Figure 2:
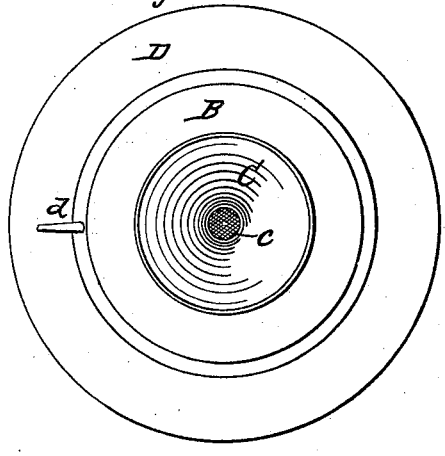

Be it known that I, JACOB M. WEBB, of Sommerville, in the county of Fayette and State of Tennessee, have invented a new and Improved Coffee-Pot; and I do hereby declare that the following is a full and exact description thereof, reference being had to the accompanying drawings, making part of this specification, Figure 1 being a vertical section of the coffee-pot with its condensing-cover in place; Fig. 2, a top view of the cover separately.

Like letters designate corresponding parts in both figures.

The nature of my invention consists in constructing a hollow cover for the coffee-pot in such a manner as to have a continual stream of cold water passing into it near the bottom, and the same quantity of heated water passing out from the upper part thereof into a receiver, which also serves to protect said cover and top of the coffee-pot from the surrounding heat, substantially in the manner and for the purposes herein set forth.

The body A, of the coffee-pot is constructed in the usual manner; the spout being closed, while steeping the coffee, by a cap $a$, to prevent any of the steam and aroma escaping thereby.

The cover consists of a cylinder B, two or three inches in depth, entirely inclosed, and fitting into the mouth of the coffee-pot. Into the top of this cover is soldered, or otherwise tightly secured, a funnel C, the pipe $b$, of which extends downward nearly to the bottom of said cover, the throat $c$, being protected by fine wire gauze $c$, in order to exclude impurities from the cover, by which it might be clogged. The bottom $g$, of the cover may be made convex downward, as represented, so that the greatest quantity of cold-water may be in the central part thereof. Around the periphery of the cylindrical cover, is secured an annular, open cup, or receiver D, by soldering its upper edge thereto. The inner periphery $e$, of this cup is made slightly flaring downward from the upper edge where it is attached, thus leaving an annular space $f$, between the cup and cover, narrowing upward, into which the upper edge of the coffee-pot fits with a wedge connection, whereby the joint is made sufficiently tight to prevent the escape of the steam, without the necessity of packing. From the upper part of the cover, a small capillary spout, or orifice $d$, leads and serves to discharge the heated water into the cup D, as far as desired.

As soon as the coffee, and water are put into the coffee-pot, this cover is placed thereon and the cap $a$, upon the spout. The funnel C, is then filled with cold water, which slowly but constantly flowing down to the bottom of the cover B, and then up and out into the receiving cup D, keeps the surface of the cover so cool as to condense all the steam which arises from the steeping coffee. The great amount of surface around the aperture $f$, both of the cover and cup, also in themselves aid very much in entirely completing the condensation. The cup D, not only serves to receive the water dripping from the cover B, but to protect said cover and the top of the coffee-pot from the surrounding heat, as also to more effectually tighten the cover upon the coffee-pot. In this way all the aroma, which would otherwise escape with the steam is preserved, thus causing the coffee to retain the most delicious part of its flavor. Less coffee also is required to obtain a beverage of equal strength and goodness. The same apparatus is equally useful in steeping tea, and in obtaining medicated extracts. After the coffee has been sufficiently steeped, the condensing cover may be removed and an ordinary lid substituted.

I do not claim a cover containing cold water, for condensing the steam generated in the coffee-pot; nor, generally, passing a stream of cold water along a condensing surface; as such are well known; but

What I claim as my invention and desire to secure by Letters Patent is—

The combination of the funnel receiver C, with its pipe $b$ descending nearly to the bottom of the hollow cover B, with said hollow cover and with a capillary spout or orifice $d$, leading from the top thereof, substantially as described, whereby a slow but continual and self-regulating flow of cold water is conducted along the condensing surface, in the manner set forth.

The above is a specification of my improved coffee pot, signed by me this 6th day of November 1855.

JACOB M. WEBB.

Witnesses:
A. YANCEY,
CALVIN JONES.